July 11, 1950 H. KRISSOFF 2,514,451

SYNAGOGUE DONATION RECORDING DEVICE

Filed May 25, 1946

INVENTOR.
HYMAN KRISSOFF
BY A. Weinburn
ATTORNEY

Patented July 11, 1950

2,514,451

UNITED STATES PATENT OFFICE 2,514,451

SYNAGOGUE DONATION RECORDING DEVICE

Hyman Krissoff, Perth Amboy, N. J.

Application May 25, 1946, Serial No. 672,306

1 Claim. (Cl. 40—65)

This invention relates to recording devices. More particularly my invention is directed to a novel method and means for recording synagogue donations.

It is a well known practice among worshippers in synagogues at certain holiday occasions to offer money donations for specfically designated uses. Since the actual handling of money in orthodox synagogues on the Sabbath or on other holy days is strictly prohibited, many attempts have been made to discover suitable means whereby some record may be had of the pledges or offers of money made at such times, so that they may be collected at a later date outside the synagogue or on non-holy days. All of these previous attempts at solving this problem have been unsuccessful because they were inefficient and burdensome for one reason or another. It is, therefore, one of the principal objects of this invention to provide a method and means whereby positive and efficient recording of any pledge may be made with a minimum of ostentation or handling.

Other objects of my invention will become apparent as the description proceeds or will hereinafter be pointed out.

In the accompanying drawing.

Referring now in detail to the drawings, I have illustrated the various elements or parts which I employ for carrying out my novel method of recording synagogue donations. I provide a set of record cards 10 of any suitable size, preferably made of a good grade of cardboard. On the front surface of the card, by means of printing or by any other suitable method, I provide a plurality of rectangular spaces 11. In this case I have illustrated twelve such spaces 11 but it is understood that any other desired number of similar spaces may be provided. Each space 11 is designated with suitable indicia to denote the specific use for which the donation or contribution is made. For example, donations may be made for the purchase of matzos, for poor families, for the rabbi, for the sick, for the Hebrew school, etc.

Figure 5:
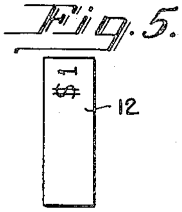
Fig. 5 is a front elevational view of one of the units shown in Fig. 1 as it is effectively used but shown here as disassociated from the card.

The size of these donations varies in different synagogues and runs anywhere from fifty cents to hundreds of dollars. In accordance with my invention, I have therefore provided, for cooperation with the spaces 11 on the card 10, a series of elongated strips 12 (see Fig. 5) at one end of which there is printed the amount of the pledged donation. In other words, a supply of these strips 12 are provided which may range from 50 cents to $200. The strips 12 may be made of any suitable material such as cardboard or paper. It is noted that the cards 10 are so designed that a space 14 is provided above the printed rectangular spaces 11 for the purpose of recording therein the names of the members of the congregation, there being one card for each member of the congregation.

In accordance with my invention, I have provided the following means whereby a set of these cards 10 and a suitable supply of the strips 12 may be taken to the synagogue and whenever a member of the congregation offers a donation for any specific purpose mentioned in one of the spaces on the card 10, a strip 12 corresponding to the size of the donation may be removably affixed to the proper space 11 on the card 10 to serve as a record to enable the proper authorities to collect on the pledge at some future date.

Each card 10 is provided with a backing layer 15 which is attached to the card 10 by means of a band of adhesive 16 adjacent the peripheral edges thereof, forming a pocket 17 between the card 10 and backing layer 15. Disposed within each space 11 of the card 10 is a through slit 20 communicating directly with the space 17.

It is thus seen from the above description that when, for example, a member of the congregation offers a donation of $1.00 for the rabbis, it is merely necessary for the operator of the system to take one of the strips 12 marked $1.00 and insert the same through the slit 20 in the space 11 suitably inscribed "For Rabbi." The card 10 is then restored to its proper alphabetical position in any suitable receptacle or file and the strip 12 is not removed until the payment is received as pledged. This forms a standing record against the name of the member of the congregation who made the pledge.

Figure 1:
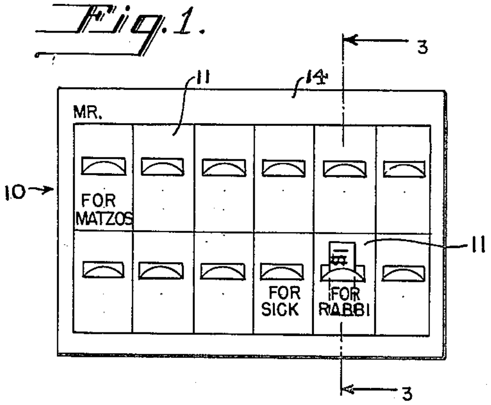
Fig. 1 is a front elevational view of a recording card constructed and arranged in accordance with my invention and forming one element of the device.
Figure 3:
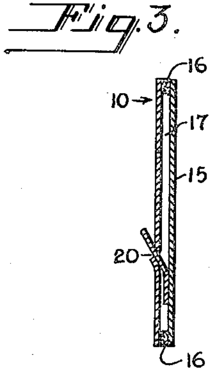
Fig. 3 is a cross-sectional view taken substantially along the line 3—3 of Fig. 1.
Figure 2:
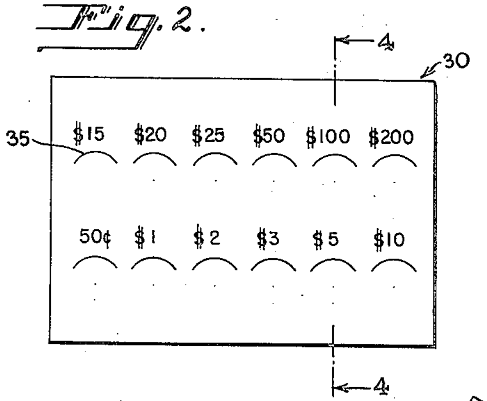
Fig. 2 is a front elevational view of a cooperating card forming another element of my recording device.
Figure 4:
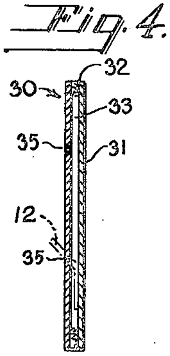
Fig. 4 is a cross-sectional view taken substantially along the line 4—4 of Fig. 2.

For convenience in storing and assorting the strips 12 according to the size of the donations, I provide a second card 30, also having a backing member 31 adhesively attached to the card 30 by a band of adhesive 32 adjacent the peripheral edges thereof to form a pocket 33. A series of through slits 35 are provided in the card 30 similar in design and function to that of the slits 20 of the card 10. Suitable indications may be printed adjacent the slits 35 and a supply of strips 12 of each denomination may be kept on the card 30, as clearly shown in Fig. 4 of the drawings.

Figure 6:
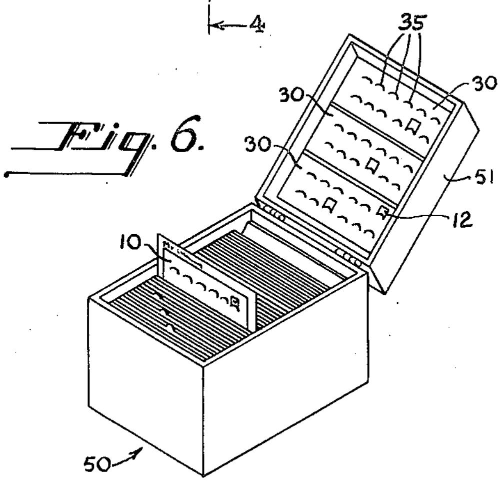
Fig. 6 is a perspective view, smaller in scale, showing a convenient method of arranging and housing the various elements of my recording device.

For greater convenience a supply of record cards 10 may be kept in a regular card index file 50, as shown in Fig. 6. These may be alphabetically arranged and indexed if desired. A plurality of cards 30 containing the slits 35 may be suitably fastened to the inner surface of the top wall of the cover 51 as clearly shown. In this manner the entire unit may be compact and unobtrusive so that there will be no visible recording done in the synagogue.

In accordance with the provisions of the patent statutes, I have herein described the principle and operation of my invention, together with the construction which I now consider to represent the best embodiment thereof, but I desire to have it understood that the construction shown is only illustrative and that the invention can be carried out by other means. Also, while it is designed to use the various features and elements in the combination and relations described, some of these may be altered and others omitted without interfering with the more general results outlined, and the invention extends to such use.

Having described by invention, what I claim and desire to secure by Letters Patent is:

A synagogue recording set comprising a card member and a donation indicating strip, said card member comprising a main front layer of cardboard material and a backing layer of suitable paper material, portions only of said backing layer being permanently attached to the rear surface of said front layer, leaving other portions thereof unattached to form a pocket space between said layers, the front surface of said front layer being provided with a space for the name of the donor and additionally marked off into a plurality of areas, each area being marked with suitable indicia to indicate a specific donating objective, each of said areas being provided with a slit passing through said front layer and communicating directly with the said pocket space, said indicating strip being adapted to be removably frictionally received in a selected slit conforming to the donation objective desired, said indicating strip having a donation sum imprinted adjacent one end thereof leaving the remaining portion thereof blank, said last named blank portion being adapted to be passed through a selected slit leaving the donation sum projecting outside said pocket space.

HYMAN KRISSOFF.

REFERENCES CITED

The following references are of record in the file of this patent:

UNITED STATES PATENTS

| Number | Name | Date |
|---|---|---|
| 652,771 | Harte | July 3, 1900 |
| 730,034 | Maconochie | June 3, 1903 |
| 1,830,506 | Cowing | Nov. 3, 1931 |